(12) United States Patent
Tang et al.

(10) Patent No.: US 12,299,033 B2
(45) Date of Patent: May 13, 2025

(54) VIDEO GENERATING METHOD AND DEVICE

(71) Applicant: SHANGHAI BILIBILI TECHNOLOGY CO., LTD., Shanghai (CN)

(72) Inventors: Ran Tang, Shanghai (CN); Yi Wang, Shanghai (CN); Long Zheng, Shanghai (CN); Jun He, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 561 days.

(21) Appl. No.: 17/549,663

(22) Filed: Dec. 13, 2021

(65) Prior Publication Data

US 2022/0188357 A1 Jun. 16, 2022

(30) Foreign Application Priority Data

Dec. 15, 2020 (CN) .......................... 202011481666.5

(51) Int. Cl.
*G06F 16/78* (2019.01)
*G06F 16/783* (2019.01)
*G06V 20/40* (2022.01)

(52) U.S. Cl.
CPC ...... *G06F 16/7837* (2019.01); *G06F 16/7867* (2019.01); *G06V 20/46* (2022.01)

(58) Field of Classification Search
CPC . G06F 16/7867; G06F 16/7837; G06V 20/62; G06V 20/46; H04N 21/26603; H04N 21/4884; H04N 21/2187
See application file for complete search history.

(56) References Cited

U.S. PATENT DOCUMENTS

| 5,717,468 A * | 2/1998 | Baryla | G11B 27/034 |
| | | | 348/E5.022 |
| 2016/0277328 A1* | 9/2016 | Ishizuka | H04L 51/226 |
| 2016/0309239 A1* | 10/2016 | Maruyama | H04N 21/23418 |
| 2020/0356782 A1* | 11/2020 | Liu | G06V 20/10 |

FOREIGN PATENT DOCUMENTS

| CN | 109302619 A | 2/2019 |
| CN | 111954060 A | 11/2020 |
| WO | WO 2018/121556 A1 | 7/2018 |
| WO | WO 2019/101038 A1 | 5/2019 |

* cited by examiner

*Primary Examiner* — Andrew M Moyer
*Assistant Examiner* — Ahmed A Nasher
(74) *Attorney, Agent, or Firm* — BakerHostetler

(57) ABSTRACT

The present disclosure describes techniques of generating videos. The techniques comprise acquiring a target video frame among a plurality of frames of a target video; acquiring at least one comment file corresponding to the target video frame, wherein the at least one comment file comprises a plurality of pieces of comment data; determining a mask file corresponding to the target video frame; determining a display coordinate of each of the plurality of pieces of comment data in the target video frame; determining each of the plurality of pieces of comment data is hidden or rendered into the target video frame based on the mask file and the display coordinate of each piece of comment data; and generating a new frame corresponding to the target frame, wherein the new frame comprises at least one subset of the plurality of pieces of comment data embedded in the target frame.

20 Claims, 5 Drawing Sheets

VIDEO GENERATING METHOD AND DEVICE

CROSS REFERENCE TO RELATED APPLICATION

The present application claims the priority to Chinese Patent Application No. 202011481666.5, titled "VIDEO GENERATING METHOD AND DEVICE", filed on Dec. 15, 2020 with the Chinese Patent Office, which is incorporated herein by reference in its entirety.

BACKGROUND

With the rapid development of computer technology and multimedia technology, various videos emerge endlessly. In the field of video playing, the comment function is very popular, in which user comments are displayed in the video. The comments in the video field can give the audience a sense of real-time interaction, which greatly increases the video watching interest and the participation sense of the audience.

SUMMARY

In view of this, there are provided a video generating method, a video generating device, a computing device and a computer-readable storage medium according to embodiments of the present disclosure, to solve problems in the conventional technology that mask comments are not synchronized with a played video.

According to a first aspect of the embodiments of the present disclosure, a video generating method is provided. The video generating method includes: acquiring a target video frame from a target video, and acquiring a comment file corresponding to the target video frame; determining a mask file corresponding to the target video frame; drawing the comment file into the target video frame according to the mask file to generate a comment video frame corresponding to the target video frame; and combining comment video frames respectively corresponding to all video frames in the target video into a comment video corresponding to the target video.

In an embodiment, the determining a mask file corresponding to the target video frame includes: performing image recognition on the target video frame to determine a target object in the target video frame; and generating the mask file according to an area where the target object is located.

In an embodiment, the determining a mask file corresponding to the target video frame includes: acquiring a mask file set corresponding to the target video; and determining the mask file corresponding to the target video frame from the mask file set according to a timestamp of the target video frame.

In an embodiment, the acquiring a comment file corresponding to the target video frame includes: acquiring a comment file set corresponding to the target video; and determining the comment file corresponding to the target video frame from the comment file set according to a timestamp of the target video frame.

In an embodiment, the drawing the comment file into the target video frame according to the mask file to generate a comment video frame corresponding to the target video frame includes: determining a display coordinate of comment data included in the comment file in the target video frame; determining whether the display coordinate of the comment data is located in a mask area of the mask file; hiding the comment data corresponding to the display coordinate in a case that the display coordinate of the comment data is located in the mask area of the mask file; and drawing the comment data at the display coordinate in the target video frame in a case that the display coordinate of the comment data is not located in the mask area of the mask file.

In an embodiment, the drawing the comment file into the target video frame according to the mask file to generate a comment video frame corresponding to the target video frame includes: selecting a target comment file from the comment file corresponding to the target video frame according to a predetermined selection rule; and drawing the target comment file into the target video frame according to the mask file to generate the comment video frame.

In an embodiment, after the combining comment video frames respectively corresponding to all video frames in the target video into a comment video corresponding to the target video, the video generating method further includes: receiving a video acquisition request sent by a client, where the video acquisition request carries a video type; returning the comment video to the client in a case that the video type is a first type; and returning the target video to the client in a case that the video type is a second type.

According to a second aspect of the embodiments of the present disclosure, a video generating device is provided. The video generating device includes: an acquisition module, a determination module, a drawing module and a combination module, where the acquisition module is configured to acquire a target video frame from a target video, and acquire a comment file corresponding to the target video frame; the determination module is configured to determine a mask file corresponding to the target video frame; the drawing module is configured to draw the comment file into the target video frame according to the mask file to generate a comment video frame corresponding to the target video frame; and the combination module is configured to combine comment video frames respectively corresponding to all video frames in the target video into a comment video corresponding to the target video.

According to a third aspect of the embodiments of the present disclosure, a computing device is provided. The computing device includes a memory and a processor. The memory stores computer-executable instructions. The processor is configured to execute the computer-executable instructions to implement the following operations of: acquiring a target video frame from a target video, and acquiring a comment file corresponding to the target video frame; determining a mask file corresponding to the target video frame; drawing the comment file into the target video frame according to the mask file to generate a comment video frame corresponding to the target video frame; and combining comment video frames respectively corresponding to all video frames in the target video into a comment video corresponding to the target video.

According to a fourth aspect of the embodiments of the present disclosure, a computer-readable storage medium is provided. The computer-readable storage medium stores computer instructions that, when executed by a processor, implement the steps of the video generating method.

With the video generating method provided in the present disclosure, a target video frame is acquired from a target video, and a comment file corresponding to the target video frame is acquired. A mask file corresponding to the target video frame is determined. Next, the comment file is drawn into the target video frame according to the mask file to generate a comment video frame corresponding to the target video frame. Comment video frames respectively corresponding to all video frames are combined in the target video into a comment video corresponding to the target video. In this way, the comments can be embedded into the video frame directly according to the mask file, and the comments within the mask are not rendered, achieving the effect of the embedded mask comments and avoiding the screen being blocked by the comments, thereby ensuring the normal watching of the user. In addition, since the video is integrated with the comments, the case that the mask comment is not synchronized with the actual content of the video due to the stuck player does not exist, which improves the watching experience of the user. Furthermore, any player can achieve the effect of the embedded mask comments, reducing the performance requirements for the client player.

DETAILED DESCRIPTION OF EMBODIMENTS

Figure 1:
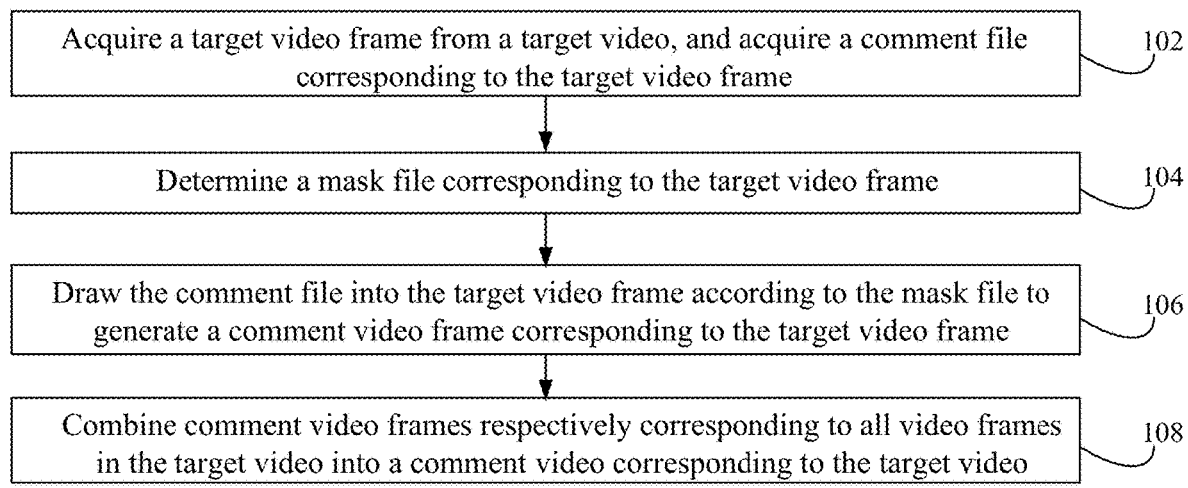
FIG. 1 is a flowchart of a video generating method according to an embodiment of the present disclosure.

In the following description, many specific details are explained in order to fully understand the present disclosure. However, the present disclosure can be implemented in many other ways different from those described herein, and those skilled in the art can make similar extensions without departing from the content of the present disclosure. Therefore, the present disclosure is not limited by specific implementations disclosed below.

The terms used in one or more embodiments of the present disclosure are only for the purpose of describing specific embodiments, and are not intended to limit the one or more embodiments of the present disclosure. In addition, the singular forms of "a", "said" and "the" used in one or more embodiments of the present disclosure and the appended claims are intended to include plural forms, unless the context clearly indicates other meanings. It should further be understood that the term "and/or" used in one or more embodiments of the present disclosure refers to and includes any or all possible combinations of one or more associated listed items.

It should be understood that, although the terms a first, second and the like may be used to describe various information in one or more embodiments of the present disclosure, the information should not be limited to these terms. These terms are only used to distinguish the same type of information from each other. For example, without departing from the scope of one or more embodiments of the present disclosure, the first may also be referred to as the second, and similarly, the second may also be referred to as the first.

Depending on the context, the word "if" as used herein can be interpreted as "at a time" or "when" or "in response to a determination".

First of all, the terminologies involved in one or more embodiments of the present disclosure are explained.

The mask refers to the outside of a marquee (the inside of the marquee is a selected area). The term mask comes from the life application, which means "a board masked on top". The mask is a kind of selection but is quite different from a regular selection. The regular selection shows a tendency to process the selected area, while the mask is used to protect the selected area from being processed and perform operation on a non-selected area.

The mask comment refers to a comment function, in which the comment does not cover the person but shows an effect of passing through behind the person.

The rendering (also being referred to as blooming) refers to a process of generating images from a model by using software, which is used to describe an effect of computing video editing software and generate the final video output, that is, a step in which the picture data is drawn on the video/display.

The FFmpeg is a free and open-source cross-platform video and audio streaming solution, and belongs to free software and uses LGPL or GPL licenses. The FFmpeg provides a complete solution for recording, converting and streaming audio and video, including a very advanced audio/video codec library libavcodec. In order to ensure high portability and codec quality, many codecs in libavcodec are developed from scratch. The FFmpeg is developed under the Linux platform, but it can also be compiled and run in other operating system environments. That is, the FFmpeg is an open-source computer program that can be used to record, convert digital audio and video, and convert the digital audio and video into streams.

Bullet screens comprise comments on a video sent from viewers, and the bullet screens move across frames of the video during a playback of the video. As a form of information interaction, the bullet screen satisfies people's information exchange needs and self-identification needs when watching videos. However, the user often encounters a large number of comments or bullet screens on a screen when watching the video, and the screen is blocked by the comments or bullet screen, which affects the normal viewing of the user.

In the conventional technology, when a client requests a server to acquire a video, the server may send the video, the comments, and person location information to each client. The client may avoid the person when displaying the comments based on the received person location information, to achieve the mask effect. However, the above method of displaying the comments requires real-time synchronization between a comment player and the video to show the effect. If the comment player is stuck, the mask effect may be not synchronized with the played video, which affects the watching experience of the user. In addition, some players do not support the function of mask comment (such as TV box, screen projection), or the performance of the machine is not enough to render the comment, resulting in the inability to render the effect of the mask comment.

A video generating method is provided in the present disclosure. The present disclosure further relates to a video generating device, a computing device, and a computer-readable storage medium, which are described in detail in the following embodiments.

Reference is made to FIG. 1, which shows a flowchart of a video generating method according to an embodiment of the present disclosure. The video generating method is applied to a server computing device. The video generating method includes the following steps 102 to 108.

In step 102, a target video frame is acquired from a target video, and a comment file corresponding to the target video frame is acquired.

In practical applications, a user often encounters a large number of comments on the screen when watching a video, and the screen is blocked by the comments, affecting the normal viewing of the user. At present, the server generally sends the video, the comments, and mask information to a client, and the client avoids the person when displaying the comments based on the received mask information, to achieve the mask effect. However, this method requires real-time synchronization between a comment player and the video to show the effect. If the comment player is stuck, the mask comment may be not synchronized with the actual content of the video, which affects the watching experience of the user. In addition, some players do not support the function of mask comment (such as TV box, screen projection), or the performance of the machine is not enough to render the comment, resulting in the inability to render the effect of the mask comment.

Therefore, a video generating method is provided in the present disclosure. In the video generating method, a target video frame is acquired from a target video, and a comment file corresponding to the target video frame is acquired. A mask file corresponding to the target video frame is determined. Next, the comment file is drawn into the target video frame according to the mask file to generate a comment video frame corresponding to the target video frame. In this way, the comments can be embedded into the video frame directly according to the mask file, and the comments within the mask are not rendered, to achieve the effect of the embedded mask comments. Since the video is integrated with the comments, the case that the mask comment is not synchronized with the actual content of the video due to the stuck player does not exist, which improves the watching experience of the user. In addition, any player can achieve the effect of the embedded mask comments, reducing the performance requirements for the client player.

Specifically, the target video refers to a video to be processed. Since the comment is required to be embedded in the video frame of the target video later, the target video needs to have corresponding comments. The target video frame is any video frame of the target video. Since embedding the comments in the target video requires performing processing separately for each video frame included in the target video, the target video frame is required to be acquired from the target video, and the comment file corresponding to the target video frame is required to be acquired.

In an embodiment, the process of acquiring the comment file corresponding to the target video frame is performed by the following operations of: acquiring a comment file set corresponding to the target video; and determining the comment file corresponding to the target video frame from the comment file set according to a timestamp of the target video frame.

It should be noted that, acquiring the comment file corresponding to the target video frame requires firstly acquiring the comment file set corresponding to the target video and then determining the comment file corresponding to the target video frame from the comment file set. In a specific implementation, the comment file set corresponding to the target video is acquired from a comment interface, so as to prepare comments required for synthesis of a video. In this case, the acquired comment file set corresponding to the target video is a set of comments to be displayed on the target video later, and comment files included in the comment file set are comments published by users for the target video before a current time instant.

In addition, since comments newly generated after this time instant cannot be displayed on the target video, the comment video is synthesized at every interval of a preset duration. That is, the comment file set corresponding to the target video is acquired at every interval of the preset duration, for the subsequent video synthesis operation.

In the present disclosure, the comment file set corresponding to the target video is acquired firstly, and for each target video frame, the comment file corresponding to the target video frame is determined, so as to facilitate subsequent drawing of the comment file into the corresponding target video frame, thereby integrating the comments with the video and ensuring a display effect of mask comments.

In step 104, a mask file corresponding to the target video frame is determined.

Specifically, on the basis of acquiring the target video frame from the target video and acquiring the comment file corresponding to the target video frame, the mask file corresponding to the target video frame is further determined. The mask file refers to a file that includes a mask range in the target video frame, that is, indicates which areas in the target video frame are not rendered with the comments.

In an embodiment, an edge of the target object in the target video is recognized by a machine learning method, and a mask file is created, that is, the mask file corresponding to the target video frame is determined, which is implemented by performing the following operations of: performing image recognition on the target video frame to determine a target object in the target video frame; and generating the mask file according to an area where the target object is located.

Specifically, the target object refers to an object in the target video frame that is not intended to be blocked. For example, the target object may be a person, prop, or scenery in the target video frame. It should be noted that the process of determining the mask file corresponding to the target video frame is in fact a process of determining which areas in the target video frame include the target object and cannot be rendered with the comments. Therefore, the image recognition is required to be performed on the target video frame to determine the area where the target object is located, and the mask file generated according to the area where the target object is located includes the areas in the target video frame that cannot be rendered with the comments, so that these areas are avoided when the comments are subsequently rendered, achieving the effect of the mask comments.

In addition, after the corresponding mask file is generated for the target video frame, a timestamp of the target video frame can be stored in correspondence with the corresponding mask file, to facilitate subsequent reuse of the corresponding mask file. In the comment synthesis for the same target video, if the image recognition has already been performed and a mask file has already been generated, the generated mask file can be directly obtained and used, without generating a comment file every time when performing the comment synthesis.

In an embodiment, since the target video frame is an image, the target video frame is inputted into an image recognition model to obtain the edge of the target object in the target video frame. The area within the edge is determined as the area where the target object is located, and a mask file is subsequently generated according to the area.

In an actual implementation, the image recognition model is obtained by performing the following operations of: acquiring an image sample, where the image sample includes a sample label, and the sample label is an edge of an object; inputting the image sample into an initial model to obtain a predicted object edge; and determining a loss value based on the predicted object edge and the sample label, and training the initial model based on the loss value until a training stop condition is reached to obtain the image recognition model.

Specifically, a cross entropy loss function is calculated based on the predicted object edge and the sample label to generate the loss value. The sample label refers to a result (i.e., a real object edge) that is really outputted by the image recognition model, that is, the sample label is a real result, while the predicted object edge outputted after the image sample is inputted into the initial model is a predicted result. In a case that a difference between the predicted result and the real result is small enough, which indicates that the predicted result is close enough to the real result, the training for the initial model is completed, and the image recognition model is obtained.

In the present disclosure, by calculating the loss value, the difference between the predicted result (the outputted object edge) and the real result (the sample label) of the model can be visually shown, so that the initial model can be specifically trained and the parameters can be adjusted to effectively improve the rate of mode training and the effect of model training.

The process of training the initial model based on the loss value until the training stop condition is reached may be performed by the following operations of: determining whether the loss value is less than a preset threshold; returning to the step of acquiring the image sample and continue the training in a case that the loss value is not less than the preset threshold; and determining that the training stop condition is reached in a case that the loss value is less than the preset threshold.

The preset threshold is a critical value of the loss value. In a case that the loss value is greater than or equal to the preset threshold, which indicates that there is still a certain deviation between the predicted result of the initial model and the real result, the parameters of the initial model are still required to be adjusted, and the image sample is still required to be acquired to continue training the initial model. In addition, in a case that the loss value is less than the preset threshold, which indicates that the predicted result of the initial model is close enough to the real result, the training may be stopped. The preset threshold may be determined according to actual situations, which is not limited in the present disclosure.

In the present disclosure, the specific training situation of the initial model can be determined according to the loss value, and the parameters of the initial model can be adjusted inversely according to the loss value in the case of unqualified training to improve the analysis ability of the model. In this way, the training rate is high, and the training effect is good.

In an embodiment, the mask file that already exists is reused. The mask file corresponding to the target video frame may also be determined by performing the following operations of: acquiring a mask file set corresponding to the target video; and determining the mask file corresponding to the target video frame from the mask file set according to a timestamp of the target video frame.

Specifically, the mask file set refers to a set of mask files respectively corresponding to all video frames in the target video. Therefore, after acquiring the set mask file set corresponding to the target video, the mask file corresponding to the target video can be determined directly according to the timestamp of the target video frame. That is, if a comment file has been generated for any one video frame in the target video, it is not required to perform the recognition again, and the comment file that has been generated can be directly reused to save computing resources.

In an embodiment, when determining the mask file corresponding to the target video frame, it is firstly attempted to acquire the mask file set corresponding to the target video. If the mask file set corresponding to the target video can be obtained, the mask file corresponding to the target video frame is directly determined according to the timestamp of the target video frame. In addition, if the mask file set corresponding to the target video cannot be obtained, the image recognition is performed on the target video frame to determine the target object in the target video frame, and the mask file corresponding to the target video frame is generated according to the area where the target object is located.

In the present disclosure, it is firstly determined whether a mask file has been generated for a video frame in the target video. If the mask file has been generated, the mask file can be directly reused. If the mask file has not been generated, the mask file is generated by the machine recognition and is stored to facilitate subsequent reuse. For the same target video, it is only required to recognize and generate the mask file once, without repeating the same calculation operation, avoiding redundant calculations and greatly saving computing resources.

In step 106, according to the mask file, the comment file is drawn into the target video frame to generate a comment video frame corresponding to the target video frame.

Specifically, on the basis of determining the mask file corresponding to the target video frame, the comment file is further drawn into the target video frame according to the mask file to generate the comment video frame.

It should be noted that, by determining the mask comment corresponding to the target video frame, a range in the target video frame where the comments are drawn can be determined, and the comments are not drawn in other ranges in the target video frame than the determined range. The comment video frame is obtained by drawing the comments into the target video frame according to the determined range.

In an embodiment, the process of drawing the comment file into the target video frame according to the mask file to generate the comment video frame is performed by the following operations of: determining a display coordinate of comment data included in the comment file in the target video frame; determining whether the display coordinate of the comment data is located in a mask area of the mask file; hiding the comment data corresponding to the display coordinate in a case that the display coordinate of the comment data is located in the mask area of the mask file; and drawing the comment data at the display coordinate in the target video frame in a case that the display coordinate of the comment data is not located in the mask area of the mask file.

Specifically, the comment file includes multiple pieces pf comment data, and each piece of comment data corresponds to one pixel when displayed in the target video frame. In other words, a comment is composed of multiple characters, and generally occupies multiple pixels when displayed in the target video frame.

In an actual implementation, the comment file is drawn into the target video frame through the FFmpeg. When drawing each piece of comment data into the target video frame, it is firstly determined whether a display pixel of this piece pf comment data in the target video frame is located in the mask area of the mask file. If the display pixel of this piece pf comment data in the target video frame is located in the mask area of the mask file, which indicates that this piece of comment data will block the target object if displayed, the comment data corresponding to the display coordinate is hidden (that is, the comment data is not drawn into the target video frame). In addition, if the display pixel of this piece pf comment data in the target video frame is not located in the mask area of the mask file, which indicates that this piece of comment data can be displayed normally without blocking the target object, in this case, the comment data corresponding to the display coordinate is drawn in the target video frame (that is, the comment data is rendered to the display coordinate of the target video frame.

In the present disclosure, when drawing the corresponding comment file on the target video frame, it is checked whether a current coordinate is within the mask range of the mask file when drawing. If the current coordinate is within the range, the comment of the coordinate is not drawn, otherwise the comment of the coordinate is drawn. In this way, the comments can be embedded into the video frame directly according to the mask file, and the comments in the mask file are not rendered, to achieve the effect of the embedded mask comments.

In an embodiment, the process of drawing the comment file into the target video frame according to the mask file to generate a comment video frame corresponding to the target video frame is performed by the following operations of: selecting a target comment file from the comment file corresponding to the target video frame according to a predetermined selection rule; and drawing the target comment file into the target video frame according to the mask file to generate the comment video frame.

Specifically, the predetermined selection rule is a predetermined rule that is used to select a part of the comment files corresponding to the target video frame, where the selected comment files are drawn into the target video frame. The predetermined selection rule may be that comment files corresponding to a user whose publishing frequency is greater than a preset frequency are selected, or the predetermined selection rule may be that comment files whose theme similarity are greater than a similarity threshold are selected.

It should be noted that, due to the limited number of comment that can be displayed on the screen, high-quality comments may be selected from a large number of comments, to be preferentially presented in the target video frame, for example, comments published by a user having a high publishing frequency and/or comments that are highly compatible with a theme of the target video frame, thereby improving a viewing experience of a viewer.

In step 108, comment video frames respectively corresponding to all video frames in the target video are combined into a comment video corresponding to the target video.

Specifically, on the basis of drawing the comment file into the target video frame according to the mask file to generate the comment video frame, comment video frames respectively corresponding to all video frames in the target video are combined into a comment video corresponding to the target video.

It should be noted that, by generating a comment video frame for each of the video frames included in the entire target video from the beginning to the end, a comment video with embedded mask comments can be obtained, which is selected by the user later. That is, in the present disclosure, the server may draw the comments into the target video to obtain the corresponding comment video, and send the comment video drawn with the comments to the client.

In an embodiment, after the comment video frames respectively corresponding to all video frames in the target video are combined into the comment video corresponding to the target video, the video generating method further includes: receiving a video acquisition request sent by a client computing device (client), where the video acquisition request carries a video type; returning the comment video to the client in a case that the video type is a first type; and returning the target video to the client in a case that the video type is a second type.

Specifically, the first type refers to a type of a target video with comments, and the second type refers to a type of a target video with no comment. In an actual implementation, if the client initiates the video acquisition request with the comment function being enabled, it is indicated that the user has enabled the comment function and wants to watch comments while watching a video. In this case, after receiving the video acquisition request (in this case, the video acquisition request carries an identification of the first type), the server may return the generated comment video to the client. In addition, if the client initiates the video acquisition request with the comment function being not enabled, it is indicated that the user does not enable the comment function, and the user only wants to watch the target video, and does not want to watch comments while watching the video. In this case, after receiving the video acquisition request (in this case, the video acquisition request carries an identification of the second type), the server may return the original target video to the client.

With the video generating method provided in the present disclosure, a target video frame is acquired from a target video, and a comment file corresponding to the target video frame is acquired. A mask file corresponding to the target video frame is determined. Next, the comment file is drawn into the target video frame according to the mask file to generate a comment video frame corresponding to the target video frame. In this way, the comments can be embedded into the video frame directly according to the mask file, and the comments within the mask are not rendered, achieving the effect of the embedded mask comments and avoiding the screen being blocked by the comments, thereby ensuring the normal watching of the user. In addition, since the video is integrated with the comments, the case that the mask comment is not synchronized with the actual content of the video due to the stuck player does not exist, which improves the watching experience of the user. Furthermore, any player can achieve the effect of the embedded mask comments, reducing the performance requirements for the client player.

Figure 2:
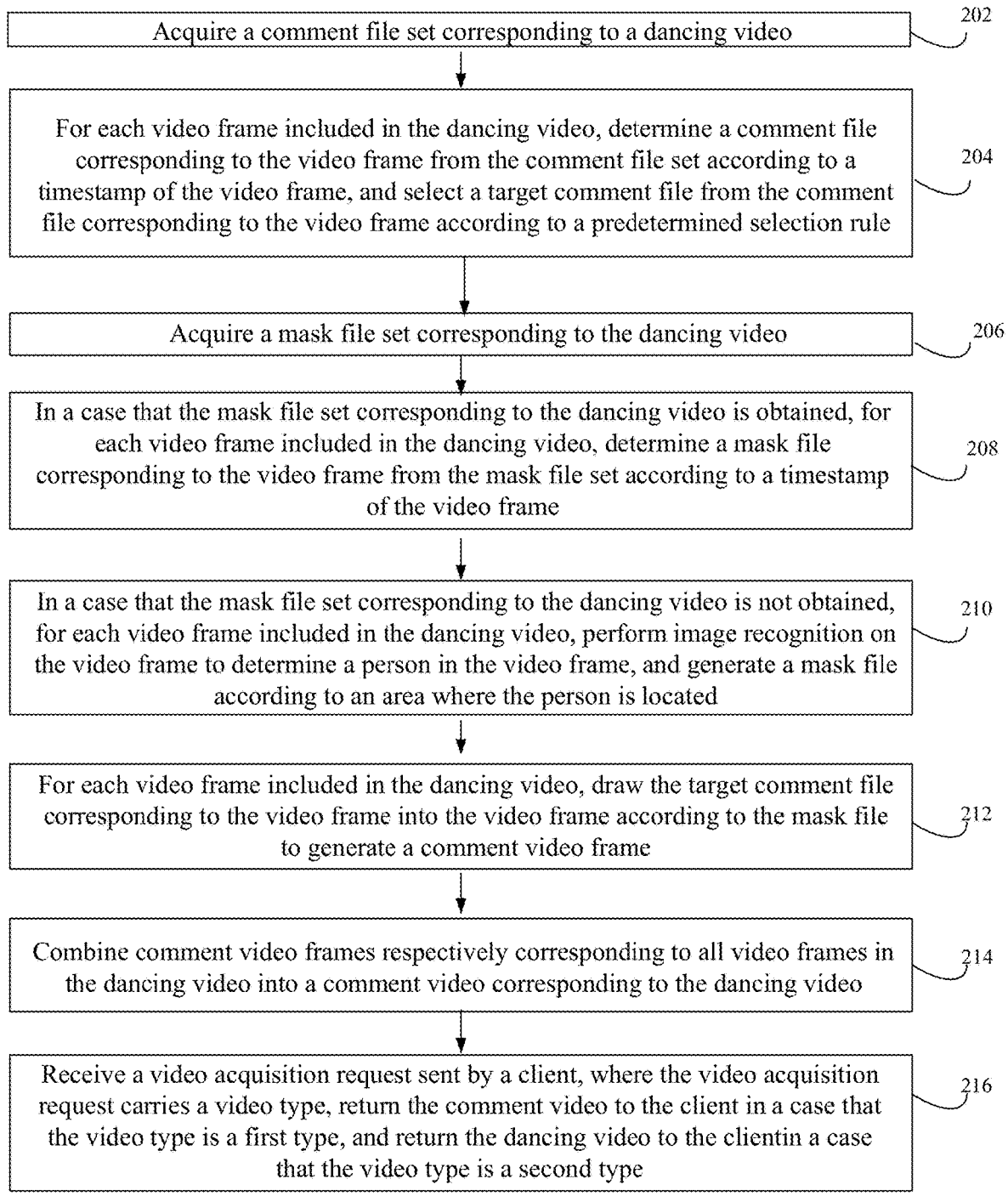
FIG. 2 is a processing flowchart of a video generating method applied to a dancing video according to an embodiment of the present disclosure.

Taking an application of the video generating method provided in the present disclosure in a dancing video as an example, the video generating method is further illustrated in the following with reference to FIG. 2, which shows a processing flowchart of a video generating method applied to a dancing video according to an embodiment of the present disclosure. The video generating method is applied to a server and includes the following steps 202 to 216.

In step 202, a comment file set corresponding to a dancing video is acquired.

In step 204, for each video frame included in the dancing video, a comment file corresponding to the video frame is determined from the comment file set according to a timestamp of the video frame, and a target comment file is selected from the comment file corresponding to the video frame according to a predetermined selection rule.

It should be noted that, due to the limited number of comment that can be displayed on the screen, high-quality comments are selected from a large number of comments, to be preferentially presented in the video, for example, comments published by a user having a high publishing frequency and/or comments that are highly compatible with a theme of the video frame, thereby improving a viewing experience of a viewer.

In step 206, a mask file set corresponding to the dancing video is acquired.

In step 208, in a case that the mask file set corresponding to the dancing video is obtained, for each video frame included in the dancing video, a mask file corresponding to the video frame is determined from the mask file set according to a timestamp of the video frame.

In step 210, in a case that the mask file set corresponding to the dancing video is not obtained, for each video frame included in the dancing video, image recognition is performed on the video frame to determine a person in the video frame, and a mask file is generated according to an area where the person is located.

It should be noted that in the present disclosure, it is firstly determined whether there is a mask file set for the target video. If the mask file set exists, the corresponding mask file can be directly reused. If the mask file set does not exist, the corresponding mask file is generated by the machine recognition and is stored to facilitate subsequent reuse. For the same video, it is only required to recognize and generate the mask file once, without repeating the same calculation operation, avoiding redundant calculations, and greatly saving calculation resources.

In step 212, for each video frame included in the dancing video, the target comment file corresponding to the video frame is drawn into the video frame according to the mask file to generate a comment video frame.

In a specific implementation, the display coordinate of the comment data included in the comment file in the target video frame is firstly determined, and then it is determined whether the display coordinate of the comment data is located in the mask area of the mask file. If the display coordinate of the comment data is located in the mask area of the mask file, the comment data corresponding to the display coordinate is hidden. In addition, if the display coordinate of the comment data is not located in the mask area of the mask file, the comment data is drawn at the display coordinate in the target video frame.

Figure 3:
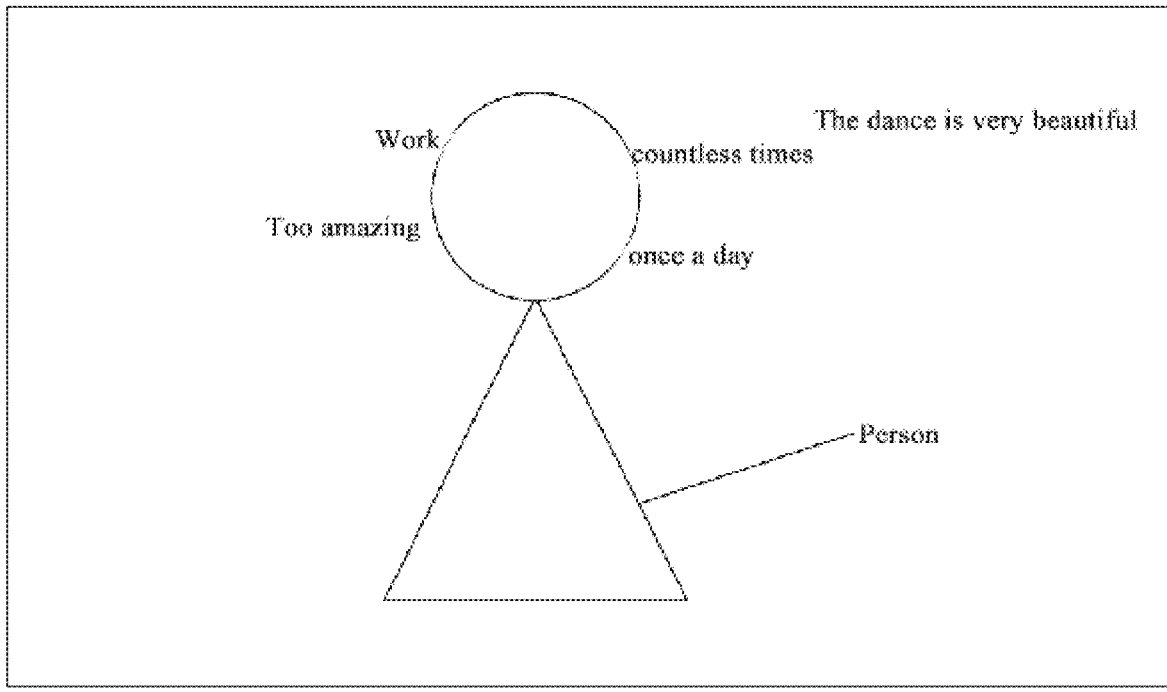
FIG. 3 is a schematic diagram of a comment video frame according to an embodiment of the present disclosure.

By way of example, FIG. 3 is a schematic diagram of a comment video frame according to an embodiment of the present disclosure. As shown in FIG. 3, no comment data in a comment file "Too amazing" is located in the mask range of the mask file, and thus all the comment data in the comment file "Too amazing" are drawn into the video frame. In addition, comment data "Work" in a comment file "Work hard" is not located in the mask range of the mask file and thus is drawn into the video frame, while comment data "hard" in the comment file "Work hard" is located in the mask range of the mask file and thus is hidden. In addition, comment data "countless times" in a comment file "Watched countless times" is not located in the mask range of the mask file and thus is drawn into the video frame, while comment data "Watched" in the comment file "Watched countless times" is located in the mask range of the mask file and thus is hidden. Furthermore, comment data "once a day" in a comment file "Watch once a day" is not located in the mask range of the mask file and thus is drawn into the video frame, while comment data "Watch" in the comment file "Watch once a day" is located in the mask range of the mask file and thus is hidden. Moreover, no comment data in a comment file "The dance is very beautiful" is located in the mask range of the mask file, and thus all the comment data in the comment file "The dance is very beautiful" are drawn into the video frame.

Figure 4:
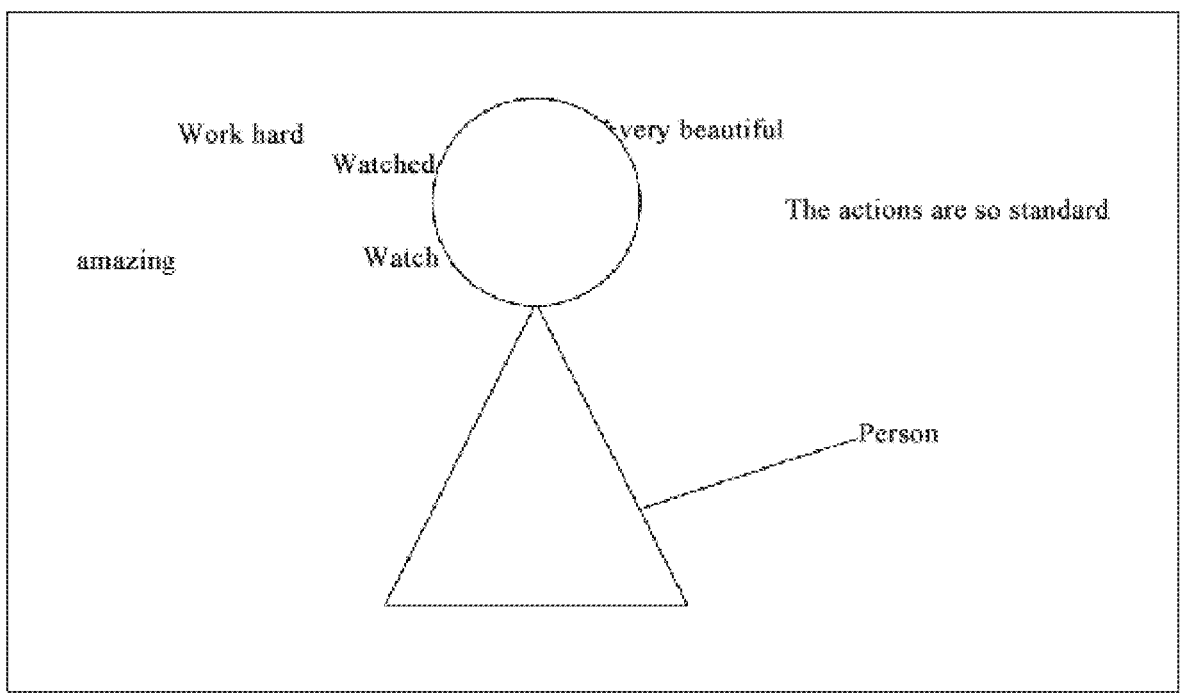
FIG. 4 is a schematic diagram of a comment video frame according to another embodiment of the present disclosure.

FIG. 4 is a schematic diagram of a comment video frame according to another embodiment of the present disclosure. As shown in FIG. 4, comment data "Too" in a comment file "Too amazing" has moved out of the screen and is not displayed, while comment data "amazing" in the comment file "Too amazing" is not located in the mask range of the mask file and thus is drawn in the video frame. In addition, no comment data in a comment file "Work hard" is located in the mask range of the mask file, and thus the comment file "Work hard" is completely drawn into the video frame. In addition, comment data "Watched" in a comment file "Watched countless times" is not located in the mask range of the mask file and thus is drawn into the video frame, while comment data "countless times" in the comment file "Watched countless times" is located in the mask range of the mask file and thus is hidden. Furthermore, comment data "Watch" in a comment file "Watch once a day" is not located in the mask range of the mask file and thus is drawn into the video frame, while comment data "once a day" in the comment file "Watch once a day" is located in the mask range of the mask file and thus is hidden. Furthermore, comment data "very beautiful" in a comment file "The dance is very beautiful" is not located in the mask range of the mask file and thus is drawn into the video frame, while comment data "The dance is" in the comment file "The dance is very beautiful" is located in the mask range of the mask file and thus is hidden. Moreover, no comment data in a comment file "The actions are so standard" is located in the mask range of the mask file, and thus the comment file "The actions are so standard" is completely drawn into the video frame.

In step 214, comment video frames respectively corresponding to all video frames in the dancing video are combined into a comment video corresponding to the dancing video.

In step 216, a video acquisition request sent by a client is received, where the video acquisition request carries a video type. In a case that the video type is a first type, the comment video is returned to the client. In addition, in a case that the video type is a second type, the dancing video is returned to the client.

With the video generating method provided in the present disclosure, for each video frame in a dancing video, a comment file corresponding to the video frame is acquired, a mask file corresponding to the video frame is determined, and the comment file is drawn into the video frame according to the mask file to generate a corresponding comment video frame. Comment video frames respectively corresponding to all the video frames in the dancing video are combined into a comment video corresponding to the dancing video. On receipt of a video acquisition request sent by a client, the comment video or the original dancing video is returned according to a type of the request. In this way, the comments can be embedded into the video frame directly according to the mask file, and the comments within the mask are not rendered, achieving the effect of the embedded mask comments and avoiding the screen being blocked by the comments, thereby ensuring the normal watching of the user. In addition, since the video is integrated with the comments, the case that the mask comment is not synchronized with the actual content of the video due to the stuck player does not exist, which improves the watching experience of the user. Furthermore, any player can achieve the effect of the embedded mask comments, reducing the performance requirements for the client player.

Figure 5:
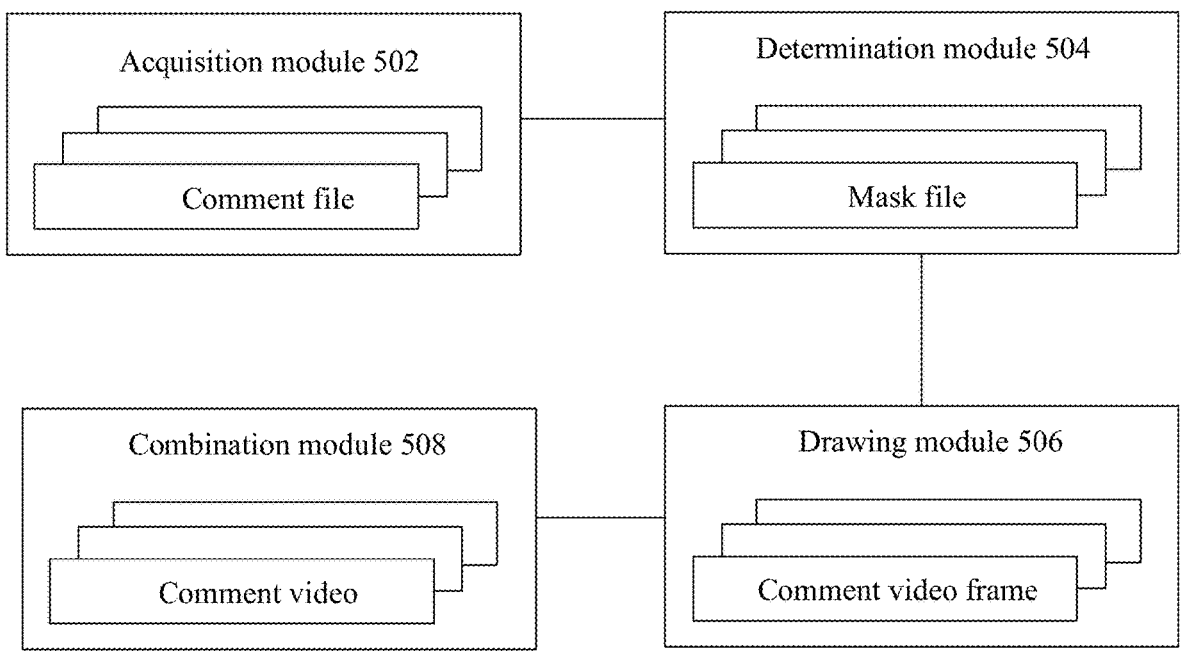
FIG. 5 is a schematic structural diagram of a video generating device according to an embodiment of the present disclosure.

Corresponding to the foregoing method embodiments, embodiments of a video generating device are further provided in the present disclosure. FIG. 5 shows a schematic structural diagram of a video generating device according to an embodiment of the present disclosure. As shown in FIG. 5, the video generating device includes: an acquisition module 502, a determination module 504, a drawing module 506, and a combination module 508.

The acquisition module 502 is configured to acquire a target video frame from a target video, and acquire a comment file corresponding to the target video frame.

The determination module 504 is configured to determine a mask file corresponding to the target video frame.

The drawing module 506 is configured to draw the comment file into the target video frame according to the mask file to generate a comment video frame corresponding to the target video frame.

The combination module 508 is configured to combine comment video frames respectively corresponding to all video frames in the target video into a comment video corresponding to the target video.

In an embodiment, the determination module 504 is further configured to: perform image recognition on the target video frame to determine a target object in the target video frame; and generate the mask file according to an area where the target object is located.

In an embodiment, the determination module 504 is further configured to: acquire a mask file set corresponding to the target video; and determine the mask file corresponding to the target video frame from the mask file set according to a timestamp of the target video frame.

In an embodiment, the acquisition module 502 is further configured to: acquire a comment file set corresponding to the target video; and determine the comment file corresponding to the target video frame from the comment file set according to a timestamp of the target video frame.

In an embodiment, the drawing module 506 is further configured to: determine a display coordinate of comment data included in the comment file in the target video frame; determine whether the display coordinate of the comment data is located in a mask area of the mask file; hide the comment data corresponding to the display coordinate in a case that the display coordinate of the comment data is located in the mask area of the mask file; and draw the comment data at the display coordinate in the target video frame in a case that the display coordinate of the comment data is not located in the mask area of the mask file.

In an embodiment, the drawing module 506 is further configured to: select a target comment file from the comment file corresponding to the target video frame according to a predetermined selection rule; and draw the target comment file into the target video frame according to the mask file to generate the comment video frame.

In an embodiment, the video generating device further includes: a receiving module, a first return module and a second return module, where the receiving module is configured to receive a video acquisition request sent by a client, where the video acquisition request carries a video type; the first return module is configured to return the comment video to the client in a case that the video type is a first type; and the second return module is configured to return the target video to the client in a case that the video type is a second type.

With the video generating device provided in the present disclosure, a target video frame is acquired from a target video, and a comment file corresponding to the target video frame is acquired. A mask file corresponding to the target video frame is determined. Next, the comment file is drawn into the target video frame according to the mask file to generate a comment video frame corresponding to the target video frame. In this way, the comments can be embedded into the video frame directly according to the mask file, and the comments within the mask are not rendered, achieving the effect of the embedded mask comments and avoiding the screen being blocked by the comments, thereby ensuring the normal watching of the user. In addition, since the video is integrated with the comments, the case that the mask comment is not synchronized with the actual content of the video due to the stuck player does not exist, which improves the watching experience of the user. Furthermore, any player can achieve the effect of the embedded mask comments, reducing the performance requirements for the client player.

The foregoing illustrates schematic solutions of the video generating device provided in the present disclosure. It should be noted that the technical solutions of the video generating device belong to the same concept as the technical solutions of the above-mentioned video generating method. For details of the technical solutions of the video generating device that are not described in detail, reference may be made to the description of the technical solutions of the above-mentioned video generating method.

Figure 6:
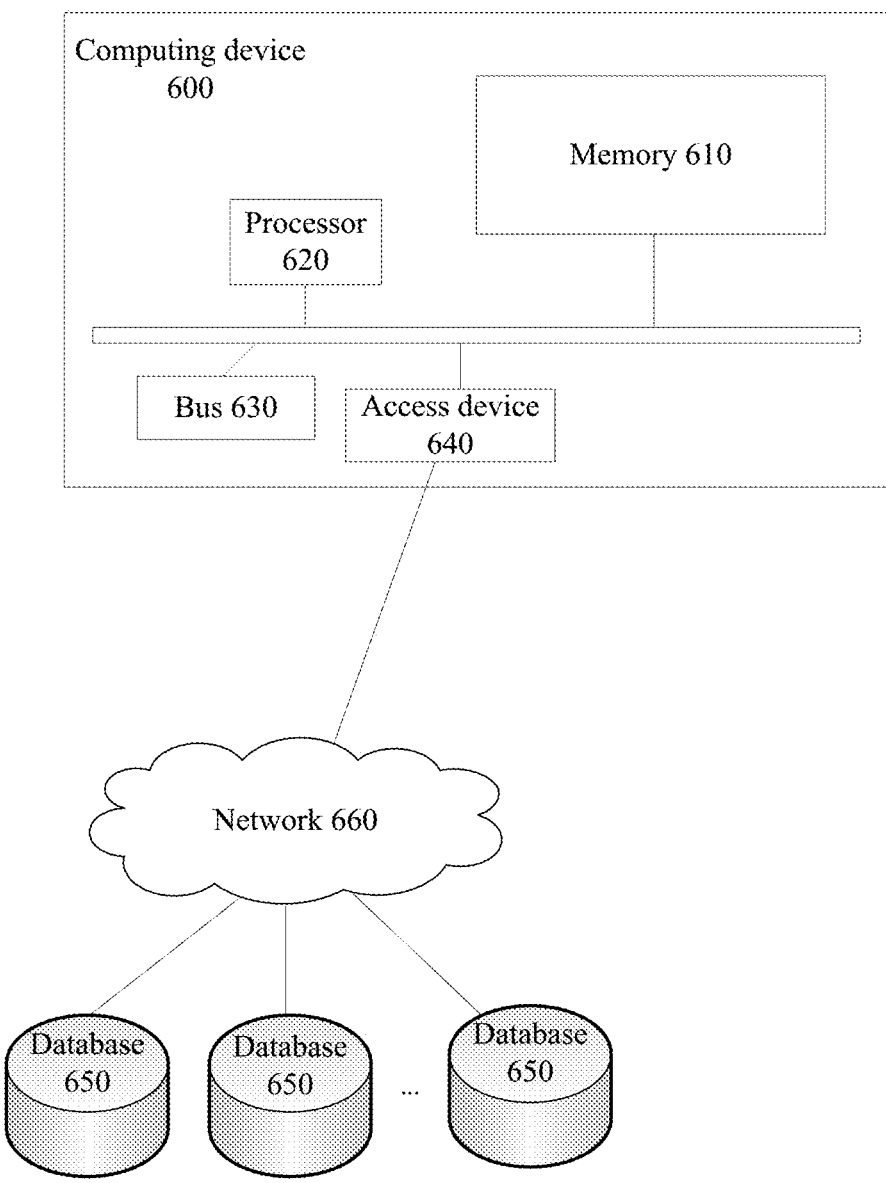
FIG. 6 is a structural block diagram of a computing device according to an embodiment of the present disclosure.

Reference is made to FIG. 6, which shows a structural block diagram of a computing device 600 according to an embodiment of the present disclosure. Components of the computing device 600 include but are not limited to a memory 610 and a processor 620. The processor 620 is connected to the memory 610 via a bus 630. A database 650 is used to store data.

The computing device 600 further includes an access device 640 that enables the computing device 600 to communicate via one or more networks 660. Examples of these networks include a public switched telephone network (PSTN), a local area network (LAN), a wide area network (WAN), a personal area network (PAN), or a combination of communication networks such as the Internet. The access device 640 may include one or more of any type of wired or wireless network interface (for example, a network interface card (NIC)), such as an IEEE802.11 wireless local area network (WLAN) wireless interface, a worldwide interoperability for microwave access (Wi-MAX) interface, an Ethernet interface, a universal serial bus (USB) interface, a cellular network interface, a Bluetooth interface, or a near field communication (NFC) interface.

In an embodiment of the present disclosure, the above components of the computing device 600 may also be connected to other components that are not shown in FIG. 6, for example, via the bus. It should be understood that the structural block diagram of the computing device shown in FIG. 6 is only for the purpose of example, and is not intended to limit the scope of the present disclosure. Those skilled in the art can add or replace other components as needed.

The computing device 600 may be any type of stationary or mobile computing device, including mobile computers or mobile computing devices (for example, a tablet computer, a personal digital assistant, a laptop computer, a notebook computer, a netbook), mobile phones (for example, a smart phone), wearable computing devices (for example, a smart watch, or smart glasses) or other types of mobile devices, or stationary computing devices such as a desktop computer or a PC. The computing device 600 may also be a mobile or stationary server.

The processor 620 is configured to execute the following computer-executable instructions of: acquiring a target video frame from a target video, and acquiring a comment file corresponding to the target video frame; determining a mask file corresponding to the target video frame; drawing the comment file into the target video frame according to the mask file to generate a comment video frame corresponding to the target video frame; and combining comment video frames respectively corresponding to all video frames in the target video into a comment video corresponding to the target video.

The foregoing illustrates a schematic solution of the computing device according to this embodiment. It should be noted that the technical solution of the computing device belongs to the same concept as the technical solutions of the above-mentioned video generating method. For details of the technical solution of the computing device that are not described in detail, reference may be made to the description of the technical solutions of the above-mentioned video generating method.

A computer-readable storage medium is further provided according to an embodiment of the present disclosure. The computer-readable storage medium stores computer instructions that, when executed by a processor, cause the processor to: acquire a target video frame from a target video, and acquire a comment file corresponding to the target video frame; determine a mask file corresponding to the target video frame; draw the comment file into the target video frame according to the mask file to generate a comment video frame corresponding to the target video frame; and combine comment video frames respectively corresponding to all video frames in the target video into a comment video corresponding to the target video.

The foregoing illustrates a schematic solution of the computer-readable storage medium according to this embodiment. It should be noted that the technical solution of the storage medium belongs to the same concept as the technical solution of the above-mentioned video generating method. For details of the technical solution of the storage medium that are not described in detail, reference may be made to the description of the technical solution of the above-mentioned video generating method.

The foregoing describes specific embodiments of the present disclosure. Other embodiments are within the scope of the appended claims. In some cases, the actions or steps described in the claims may be performed in a different order from that in the embodiments and still achieve desired results. In addition, the processes depicted in the drawings are not required to be performed in the specific order or sequential order shown to achieve the desired results. In some embodiments, multitasking and parallel processing are also possible or may be advantageous.

The computer instructions include computer program codes. The computer program codes may be in the form of source codes, object codes, executable files, or in some intermediate forms. The computer-readable storage medium may include: any entity or device capable of carrying the computer program codes, a recording medium, a U disk, a mobile hard disk, a magnetic disk, an optical disk, a computer memory, a read-only memory (ROM), a random access memory (RAM), an electrical carrier signal, a telecommunication signal, and a software distribution medium, and the like. It should be noted that the content contained in the computer-readable storage medium can be appropriately added or deleted according to requirements of the legislation and patent practice in the jurisdiction. For example, in some jurisdictions, the computer-readable storage medium does not include the electrical carrier signal and the telecommunication signal, according to the legislation and patent practice.

It should be noted that, the above-mentioned method embodiments are all expressed as a series of combinations of actions for simplicity of description, but those skilled in the art should understand that the present disclosure is not limited by the described sequence of actions. This is because according to the present disclosure, some steps can be performed in other order or performed simultaneously. In addition, those skilled in the art should also understand that the embodiments described in the specification are all preferred embodiments, and the actions and modules involved are not necessarily all required by the specification.

In the above-mentioned embodiments, the description of each embodiment has its own emphasis. For parts that are not described in detail in an embodiment, reference may be made to related descriptions of other embodiments.

The embodiments of the present disclosure disclosed above are only used to help explain the present disclosure, and do not limit the present disclosure. Apparently, many modifications and changes can be made according to the content of this specification. These embodiments are selected and specifically described in this specification in order to better explain the principles and practical applications of the present disclosure, so that those skilled in the art can understand and use the present disclosure well. The present disclosure is only limited by the claims and a full scope and equivalents thereof.

What is claimed is:

1. A method of generating videos, comprising:
   acquiring a target video frame among a plurality of frames of a target video;
   acquiring at least one comment file corresponding to the target video frame, wherein the at least one comment file comprises a plurality of pieces of comment data;
   determining a mask file corresponding to the target video frame, wherein the mask file is generated based on recognizing a target object in the target video frame;
   determining a display coordinate of each of the plurality of pieces of comment data in the target video frame;
   determining a first piece of comment data among the plurality of pieces of comment data is hidden in the target video frame based on the mask file and the display coordinate of each of the plurality of pieces of comment data, wherein the first piece of comment data is hidden in response to determining that a display coordinate of the first piece of comment data is located in a mask area defined by the mask file; and
   generating a new frame corresponding to the target video frame, wherein the new frame comprises content of the target video frame and at least one subset of the plurality of pieces of comment data embedded in the target video frame, wherein the new frame does not display the first piece of comment data that is hidden.

2. The method of claim 1, further comprising:
   generating a plurality of new frames corresponding to the plurality of frames of the target video based on a plurality of comment files and a plurality of mask files corresponding to the plurality of frames of the target video, wherein each of the plurality of new frames comprises content of a corresponding frame of the target video and comment data embedded in the corresponding frame; and combining the plurality of new frames into a commented video corresponding to the target video.

3. The method of claim 1, wherein the determining a mask file corresponding to the target video frame further comprises:

performing image recognition on the target video frame to determine the target object in the target video frame; and generating the mask file based on an area where the target object is located.

4. The method of claim 1, wherein the determining a mask file corresponding to the target video frame further comprises:

acquiring a set of mask files corresponding to the target video; and determining the mask file corresponding to the target video frame from the set of mask files based on a timestamp of the target video frame.

5. The method of claim 1, wherein the acquiring at least one comment file corresponding to the target video frame further comprises:

acquiring a set of comment files corresponding to the target video; and determining the at least one comment file corresponding to the target video frame from the set of comment files based on a timestamp of the target video frame.

6. The method of claim 1, wherein the determining each of the plurality of pieces of comment data is hidden or rendered into the target video frame further comprises:

determining whether the display coordinate of each of the plurality of pieces of comment data is located in mask area defined by the mask file; and in response to determining that a second display coordinate of a second piece of comment data among the plurality of pieces of comment data is not located in the mask area, rendering the second piece of comment data at the second display coordinate.

7. The method of claim 1, wherein the at least one comment file is selected from a plurality of comment files corresponding to the target video frame based on a predetermined selection rule.

8. The method of claim 2, further comprising:

receiving a video acquisition request sent from a client computing device, wherein the video acquisition request comprises information indicative of a video type; and transmitting the commented video or the target video to the client computing device based on the information indicative of the video type.

9. A system, comprising:

at least one processor; and at least one memory communicatively coupled to the at least one processor and comprising computer-readable instructions that upon execution by the at least one processor cause the at least one processor to perform operations comprising:

acquiring a target video frame among a plurality of frames of a target video;

acquiring at least one comment file corresponding to the target video frame, wherein the at least one comment file comprises a plurality of pieces of comment data;

determining a mask file corresponding to the target video frame, wherein the mask file is generated based on recognizing a target object in the target video frame;

determining a display coordinate of each of the plurality of pieces of comment data in the target video frame;

determining whether each a first piece of comment data among of the plurality of pieces of comment data is hidden or rendered into in the target video frame based on the mask file and the display coordinate of each of the plurality of pieces of comment data, wherein the first piece of comment data is hidden in response to determining that a display coordinate of the first piece of comment data is located in a mask area defined by the mask file; and generating a new frame corresponding to the target video frame, wherein the new frame comprises content of the target video frame and at least one subset of the plurality of pieces of comment data embedded in the target video frame, wherein the new frame does not display the first piece of comment data that is hidden.

10. The system of claim 9, the operations further comprising:

generating a plurality of new frames corresponding to the plurality of frames of the target video based on a plurality of comment files and a plurality of mask files corresponding to the plurality of frames of the target video, wherein each of the plurality of new frames comprises content of a corresponding frame of the target video and comment data embedded in the corresponding frame; and combining the plurality of new frames into a commented video corresponding to the target video.

11. The system of claim 9, wherein the determining a mask file corresponding to the target video frame further comprises:

performing image recognition on the target video frame to determine the target object in the target video frame; and generating the mask file based on an area where the target object is located.

12. The system of claim 9, wherein the determining a mask file corresponding to the target video frame further comprises:

acquiring a set of mask files corresponding to the target video; and determining the mask file corresponding to the target video frame from the set of mask files based on a timestamp of the target video frame.

13. The system of claim 9, wherein the acquiring at least one comment file corresponding to the target video frame further comprises:

acquiring a set of comment files corresponding to the target video; and determining the at least one comment file corresponding to the target video frame from the set of comment files based on a timestamp of the target video frame.

14. The system of claim 9, wherein the determining each of the plurality of pieces of comment data is hidden or rendered into the target video frame further comprises:

determining whether the display coordinate of each of the plurality of pieces of comment data is located in a mask area defined by the mask file; and in response to determining that a second display coordinate of a second piece of comment data among the plurality of pieces of comment data is not located in the mask area, rendering the second piece of comment data at the second display coordinate.

15. A non-transitory computer-readable storage medium, storing computer-readable instructions that upon execution by a processor cause the processor to implement operations comprising:
- acquiring a target video frame among a plurality of frames of a target video;
- acquiring at least one comment file corresponding to the target video frame, wherein the at least one comment file comprises a plurality of pieces of comment data;
- determining a mask file corresponding to the target video frame, wherein the mask file is generated based on recognizing a target object in the target video frame;
- determining a display coordinate of each of the plurality of pieces of comment data in the target video frame;
- determining whether each a first piece of comment data among of the plurality of pieces of comment data is hidden or rendered into in the target video frame based on the mask file and the display coordinate of each of the plurality of pieces of comment data, wherein the first piece of comment data is hidden in response to determining that a display coordinate of the first piece of comment data is located in a mask area defined by the mask file; and
- generating a new frame corresponding to the target video frame, wherein the new frame comprises content of the target video frame and at least one subset of the plurality of pieces of comment data embedded in the target video frame, wherein the new frame does not display the first piece of comment data that is hidden.

16. The non-transitory computer-readable storage medium of claim 15, the operations further comprising:
- generating a plurality of new frames corresponding to the plurality of frames of the target video based on a plurality of comment files and a plurality of mask files corresponding to the plurality of frames of the target video, wherein each of the plurality of new frames comprises content of a corresponding frame of the target video and comment data embedded in the corresponding frame; and
- combining the plurality of new frames into a commented video corresponding to the target video.

17. The non-transitory computer-readable storage medium of claim 15, wherein the determining a mask file corresponding to the target video frame further comprises:
- performing image recognition on the target video frame to determine the target object in the target video frame; and
- generating the mask file based on an area where the target object is located.

18. The non-transitory computer-readable storage medium of claim 15, wherein the determining a mask file corresponding to the target video frame further comprises:
- acquiring a set of mask files corresponding to the target video; and
- determining the mask file corresponding to the target video frame from the set of mask files based on a timestamp of the target video frame.

19. The non-transitory computer-readable storage medium of claim 15, wherein the acquiring at least one comment file corresponding to the target video frame further comprises:
- acquiring a set of comment files corresponding to the target video; and
- determining the at least one comment file corresponding to the target video frame from the set of comment files based on a timestamp of the target video frame.

20. The non-transitory computer-readable storage medium of claim 15, wherein the determining each of the plurality of pieces of comment data is hidden or rendered into the target video frame further comprises:
- determining whether the display coordinate of each of the plurality of pieces of comment data is located in a mask area defined by the mask file; and
- in response to determining that a second display coordinate of a second piece of comment data among the plurality of pieces of comment data is not located in the mask area, rendering the second piece of comment data at the second display coordinate.

* * * * *